US009697361B2

United States Patent
Efremov et al.

(10) Patent No.: US 9,697,361 B2
(45) Date of Patent: Jul. 4, 2017

(54) SYSTEM AND METHOD OF CONTROLLING OPENING OF FILES BY VULNERABLE APPLICATIONS

(71) Applicant: Kaspersky Lab ZAO, Moscow (RU)

(72) Inventors: Andrey A. Efremov, Moscow (RU); Andrey V. Ladikov, Moscow (RU); Andrey Y. Solodovnikov, Moscow (RU); Alexey V. Monastyrsky, Moscow (RU)

(73) Assignee: AO Kaspersky Lab, Moscow (RU)

( * ) Notice: Subject to any disclaimer, the term of this patent is extended or adjusted under 35 U.S.C. 154(b) by 2 days.

(21) Appl. No.: 14/791,827

(22) Filed: Jul. 6, 2015

(65) Prior Publication Data
US 2017/0011220 A1    Jan. 12, 2017

(51) Int. Cl.
| G06F 17/00 | (2006.01) |
| H04L 29/06 | (2006.01) |
| G06F 21/57 | (2013.01) |
| G06F 21/55 | (2013.01) |
| G06F 21/62 | (2013.01) |
| G06F 21/56 | (2013.01) |
| G06F 21/60 | (2013.01) |

(52) U.S. Cl.
CPC .......... *G06F 21/577* (2013.01); *G06F 21/554* (2013.01); *G06F 21/561* (2013.01); (Continued)

(58) Field of Classification Search
CPC .... G06F 21/577; G06F 21/561; G06F 21/564; G06F 21/604; G06F 21/6218; G06F 2221/033
(Continued)

(56) References Cited

U.S. PATENT DOCUMENTS

| 7,913,092 B1 * | 3/2011 | Hiltunen ................. G06F 21/54 713/187 |
| 8,701,194 B2 | 4/2014 | Kester et al. |

(Continued)

FOREIGN PATENT DOCUMENTS

EP    2199939 A1    6/2010

OTHER PUBLICATIONS

Paul K. Harmer, An Artificial Immune System Architecture for Computer Security Applications, IEEE Transactions on Evolutionary Computation, vol. 6, No. 3, Jun. 2002; p. 252-280.*

*Primary Examiner* — Monjour Rahim
(74) *Attorney, Agent, or Firm* — Arent Fox LLP; Michael Fainberg

(57) ABSTRACT

Disclosed are systems and methods for controlling opening of computer files by vulnerable applications. An example method includes: detecting a request from a software application to open a computer file on the user computer; determining one or more parameters of the file; determining a file access policy based on the parameters of the file, wherein the file access policy specifies at least access rights of the software application to the resources of the user computer; identifying vulnerabilities of the software application; determining an application launching policy for the software application based at least on the determined vulnerabilities, wherein the application launching policy specifies at least whether opening of the file is permitted or prohibited; and controlling opening of the file on the user computer and accessing of the computer resources by the software application working with the opened file based on the file access policy and application launching policy.

22 Claims, 3 Drawing Sheets

(52) U.S. Cl.
CPC .......... *G06F 21/564* (2013.01); *G06F 21/604* (2013.01); *G06F 21/6218* (2013.01); *G06F 2221/033* (2013.01)

(58) Field of Classification Search
USPC .......................................................... 726/1
See application file for complete search history.

(56) References Cited

U.S. PATENT DOCUMENTS

| | | | | |
|---|---|---|---|---|
| 2006/0271596 | A1* | 11/2006 | Sabsevitz | G06F 17/30067 |
| 2007/0028291 | A1* | 2/2007 | Brennan | H04L 63/1408 726/1 |
| 2007/0199044 | A1* | 8/2007 | Hughes | H04L 63/20 726/1 |
| 2008/0016339 | A1* | 1/2008 | Shukla | G06F 21/53 713/164 |
| 2008/0209138 | A1 | 8/2008 | Sheldon et al. | |
| 2009/0138969 | A1* | 5/2009 | Kim | G06F 21/51 726/22 |
| 2010/0146589 | A1 | 6/2010 | Safa | |
| 2010/0306851 | A1* | 12/2010 | Zhou | G06F 21/554 726/25 |
| 2011/0296526 | A1 | 12/2011 | Kim et al. | |
| 2014/0283065 | A1* | 9/2014 | Teddy | H04L 63/145 726/23 |
| 2015/0047046 | A1 | 2/2015 | Pavlyushchik | |
| 2015/0332043 | A1* | 11/2015 | Russello | G06F 11/30 726/23 |

* cited by examiner

SYSTEM AND METHOD OF CONTROLLING OPENING OF FILES BY VULNERABLE APPLICATIONS

FIELD OF TECHNOLOGY

The present disclosure relates generally to the field of computer security, and more specifically, to a system and method for controlling opening of computer files by vulnerable software applications.

BACKGROUND

The number of software applications that are used on computing devices, including personal computers, tables and smartphones (commonly referred herein as "computers"), is increasing today with a staggering rate. When a software application deployed on a computer receives or opens a computer file, the computer can often become vulnerable to attack by malicious software. Malicious software, or "malware," can include viruses, Trojan horses, spyware, worms, bots, and the like, developed by hackers. Since malware continues to cause many problems for computers and their users, many efforts have been made to develop sophisticated antivirus applications to protect against malware.

One problem is that antivirus applications typically scans every suspicious file on the computer, and hence the application may consume a significant proportion of the computer's resources. However, because the severity of potential damage that malware may cause, the computer system often provides little choice other than to divert resources for running the antivirus application away from other applications executing on the computer.

The drain on the resources of the computer is not limited to the period of time immediately following a new software file's introduction to the computer, when the software is initially scanned. Resources are needed for subsequent scans of the file, which is rescanned because antivirus applications are regularly updated to enable them to protect against newly-discovered malware. That is, certain files initially determined to be free of malware may later be determined to contain malware after being rescanned by the updated antivirus application. Thus, resources for multiple scans are needed to improve the quality of the protection against malware.

Unfortunately, malware continues to become more sophisticated and more dangerous for computers and their users. Thus, antivirus applications require more of the computer resources to operate effectively. Accordingly, it would be desirable under the present circumstances to provide a system that can create rules or criteria to restrict the permission for software applications to open computer files under certain conditions in order to limit the amount of computer resources used to protect against possible malware.

SUMMARY

Disclosed are example systems, methods and computer program products for controlling opening of computer files by vulnerable applications. An example method includes: detecting a request from a software application to open a computer file on the user computer; determining one or more parameters of the file; determining a file access policy based on the parameters of the file, wherein the file access policy specifies at least access rights of the software application to the resources of the user computer; identifying vulnerabilities of the software application; determining an application launching policy for the software application based at least on the determined vulnerabilities, wherein the application launching policy specifies at least whether opening of the file is permitted or prohibited; and controlling opening of the file on the user computer and accessing of the computer resources by the software application working with the opened file based on the file access policy and application launching policy.

In another example aspect, the software application includes one or more of a source application that created the computer file and a consumer application that requested opening of the computer file on the user computer.

In another example aspect, the computer file created by the source application includes one of a process, an executable file, a script file and a dynamic library.

In another example aspect, the method further includes: determining when the computer file is created by the source application using at least one of a file system filter driver, intercept of operating system (OS) Application Programming Interface (API) calls on the user computer, and API provided by the source application on the user computer.

In another example aspect, the parameters of the computer file determined by the hardware processor include at least one of a type of the computer file, a size of the computer file, a digital signature of the computer file, and an extension of the computer file.

In another example aspect, determining, by the hardware processor, one or more parameters of the computer file further includes: performing antivirus analysis of the computer file, wherein parameters of the computer file include results of the antivirus analysis.

In another example aspect, the identifying vulnerabilities of the software application further comprises: determining corrected vulnerabilities in the software application, determining vulnerabilities in previous versions of the software application, and determining corrected vulnerabilities in the previous versions of the software application.

In another example aspect, the method further includes: specifying priorities of the file access policies and application launching policies, whereby controlling opening of the computer file and accessing of the computer resource by the software application is based on the respective priorities of the file access policies and application launching policies.

In another example aspect, the access rights to the computer sources include prohibiting the software application from performing one or more of the following operations: low-level accessing to a file system of the computer; low-level accessing to a disk; executing a driver on the computer; modifying a registry of the computer; direct accessing of memory of the computer; obtaining a process descriptor; using a browser's API; modifying files with extensions .exe and .dll in directories "% SystemRoot %" and "% ProgramFiles %", with all subdirectories, creating and modifying files in a Startup directory of the computer; creating and modifying auto run keys; accessing file resources with addresses including environment variables; and accessing user registry resources of the computer.

In another example aspect, the method further includes: determining, by the hardware processor, whether the software application is a source of untrusted files based on one or more of: searching in a database of known source applications of untrusted files, analysis of the behavior of the source application for loading of vulnerable modules or untrusted files; and analysis of metadata of the source application; and further controlling, by the hardware processor, opening of the computer file on the user computer and accessing of the computer resources by the software application based on the determination whether the software application is the source of untrusted files.

In another aspect, an example system for controlling opening of computer files by software applications on a user computer, the system comprising: a hardware processor configured to: detect a request from a software application to open a computer file on the user computer; determine one or more parameters of the computer file; determine a file access policy associated with the requested computer file based on the parameters of the computer file, wherein the file access policy specifies at least access rights of the software application to the resources of the user computer when working with the requested computer file; identify vulnerabilities of the software application; determine an application launching policy for the software application based at least on the determined vulnerabilities, wherein the application launching policy specifies at least whether opening of the file is permitted or prohibited; and control opening of the computer file on the user computer and accessing of the computer resources by the software application working with the opened file based at least on the file access policy and application launching policy.

In yet another aspect, an example non-transitory computer readable medium comprising computer executable instructions for controlling opening of computer files by software applications on a user computer, including instructions for: detecting a request from a software application to open a computer file on the user computer; determining one or more parameters of the computer file; determining a file access policy associated with the requested computer file based on the parameters of the computer file, wherein the file access policy specifies at least access rights of the software application to the resources of the user computer when working with the requested computer file; identifying vulnerabilities of the software application; determining an application launching policy for the software application based at least on the determined vulnerabilities, wherein the application launching policy specifies at least whether opening of the file is permitted or prohibited; and controlling opening of the computer file on the user computer and accessing of the computer resources by the software application working with the opened file based at least on the file access policy and application launching policy.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for controlling opening of computer files by vulnerable software applications. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
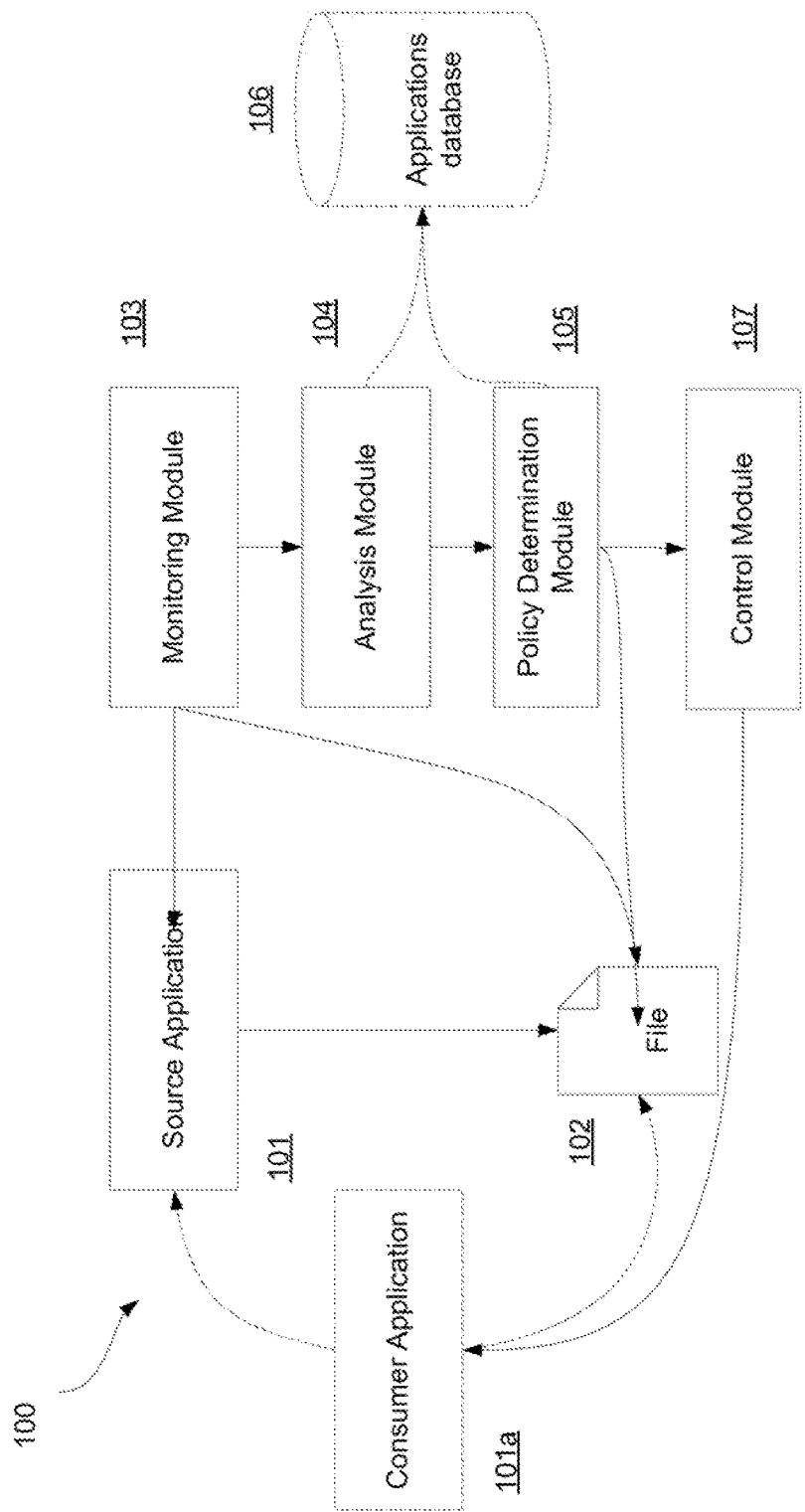
FIG. 1 illustrates a schematic diagram of an example system for controlling opening of files by vulnerable applications.

FIG. 1 illustrates the system 100 for controlling opening of computer files created by vulnerable software applications. The term "application" refers to one or more versions of a computer program (such as Microsoft Word, Internet Explorer, etc.) The term "vulnerable applications" refers to applications that are known to have or have had vulnerabilities. The term "vulnerability" includes but not limited to any errors, weakness or oversight in software code or logic, which can be exploited by a malefactor for obtaining access to the computer system or network on which said software runs. In addition, the applications which may be used to deliver to the computer untrusted files or other unwanted objects (such as malicious software) may also be considered as "vulnerable applications" (such as a web browser, IM-client). In one example aspect, a list of vulnerable applications by means of which a computer can be exposed to untrusted files may be pre-formed on the side of the antivirus application developer and stored on the user's computer application database 106. Untrusted files may include but not limited to files that may potentially cause harm to a computer system, such as malicious or vulnerable files.

In one example aspect, the system 100 includes a monitoring module 103 configured to identify when a file 102 was created by the source application 101 or attempted to be opened by a consumer application 101a. The monitoring module 103 also configured to determine parameters of the file 102. The system 100 further includes an analysis module 104 configured to identify security vulnerabilities in the source application 101 and/or consumer application 101a and whether the source application 101 and/or consumer application 101a is associated with any untrusted file sources. To accomplish that, in one example aspect, the analysis module 104 may use application database 106 that contains a list of known vulnerable applications and their vulnerabilities, and a list of applications that are known to be sources of untrusted files. In another example aspect, the analysis module 104 may analyze the behavior of the source application 101a for, for example, loading by the source application of vulnerable modules or untrusted objects. In yet another aspect, the analysis module 104 may analyze metadata of the application. The system 100 further includes a policy determination module 105 configured to determine file opening policy for file 102, and a control module 107 configured to intercept opening of file 102 by application 101 and/or 101a.

In one example aspect, the monitoring module 103 is configured to determine parameters of the file 102, for example, at the time of it creation by the source application 101 or at the time of its opening by the consumer application 101a. The parameters of file 102 may include, but not limited to: a file type (e.g., text, image, pdf, macro, executable, etc.), file size, presence of electronic digital signature (EDS), the name of the certification authority of the EDS, the source of the file (e.g., address of the source server), presence of the file in a list of trusted files, which may be stored in the application database 106, the file extension and so on.

In one example aspect, the consumer application 101a that attempts to open the file 102 may be the same as the source application 101 (for example, Microsoft Word® has created a text file that may be afterwards be opened also in Microsoft Word®). In another example aspect, the consumer application 101a may be the file 102, if it is an executable file, a script file, or a dynamic link library (for example, an executable file has been downloaded with the help of an Internet browser and saved to disk, which will later be executed on the computer without the use of external applications). It is contemplated that file opening may include both direct opening of a file 102 by an consumer application 101a when the file is not an executable file and executing the file 102 when the file 102 is an executable file.

In one example aspect, the analysis module 104 may be further configured to determine the presence of vulnerabilities in previous versions of the application 101. The analysis module may determine the presence of vulnerabilities using application database 106, which contains a list of vulnerabilities in known applications. In yet another aspect, the analysis module 104 may be additionally configured to determine the presence of patched vulnerabilities in the application 101, and also in preceding versions of the application 101. In yet another aspect, the analysis module 104 may be configured to determine the presence of vulnerabilities in the consumer application 101a. As used herein, the patched vulnerabilities include vulnerabilities for which the software manufacturer has released an update (patch) correcting mistakes that might otherwise be exploited by a hacker, malware or the like. Moreover, such updates should be installed on the computer system of the user. Vulnerabilities for which no update has yet been released or installed will be termed hereinafter "vulnerabilities".

In one example aspect, the policy determination module 105 is configured to determine file opening policy of file 102 for the consumer application 101a based on the information determined by the monitoring module 103 and the analysis module 104. In one example aspect, the file opening policy for file 102 is determined based on the file access policy and application lunching policy for the consumer application 101a.

In one example aspect, the file access policies specify access rights of the consumer application 101a that uses the file 102 to the resources of the user computer on which application is running when working with the file 102. In one example aspect, the access rights may include limitations (e.g., prohibition or permissions) of the consumer application 101a on performing various operations with the computer resources. Such operation include, but not limited to: performing low-level access to the file system; performing low-level access to the hard disk drive; launching a driver; modifying OS registry; directly accessing the computer memory; obtaining a process descriptor; using application programming interface ("API") of the Web browser; modifying files with extensions .exe and .dll in directories defined by environment variables "% SystemRoot %" and "% ProgramFiles %", with all subdirectories; creating and modifying files in the "Startup" directory; creating and modifying of autorun keys; accessing file resources whose address includes environment variables; and accessing the user's registry resources; and other operations.

In one example aspect, the application launching policy for the consumer application 101a specifies the rules of launching of the consumer application 101a (e.g., to allow or prohibit opening of the file 102). The application launching policy for the software application may be based at least on the determined vulnerabilities of the consumer application 101 and/or consumer application 101a, and, particularly, based on the presence or absence of corrected and uncorrected vulnerabilities in various versions of the applications.

In another aspect, the applications database 106 may additional contain a list of applications with the corresponding file opening policies, and a corresponding list of unpatched and patched vulnerabilities contained in all versions of the applications.

In one example aspect, the control module 107 is connected to the policy determination module 105 and configured to intercept requests to open a file 102 by the consumer application 101a. In another example aspect, the control module 107 may be further configured to control the opening of the file 102 by consumer application 101a based on a file opening policy.

Figure 2:
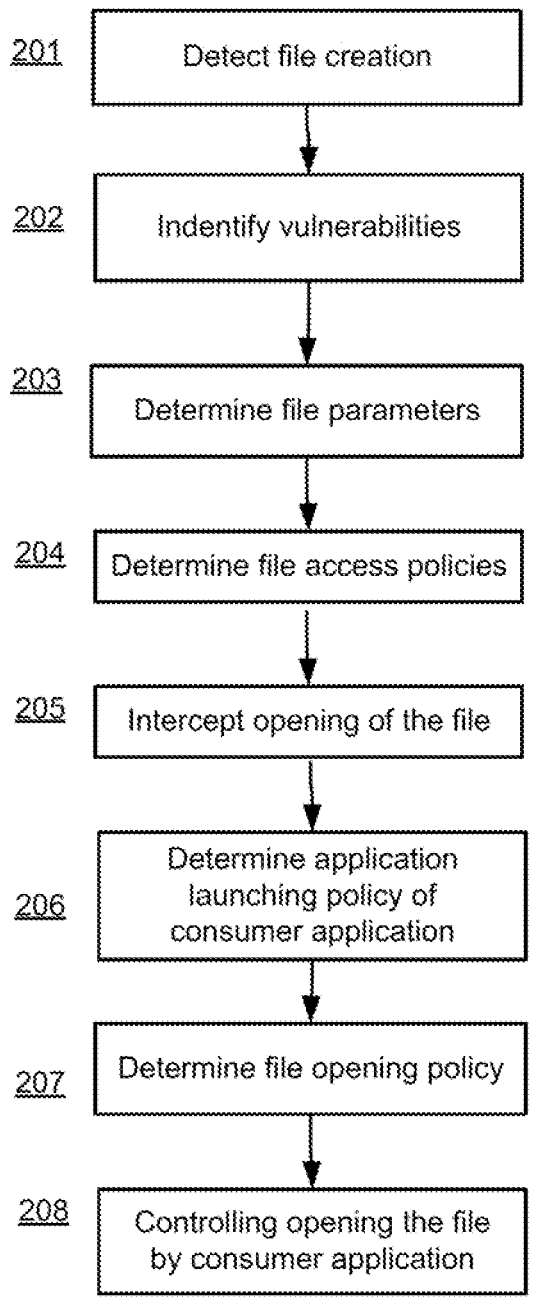
FIG. 2 illustrates a flow chart of an example method for controlling opening of files by vulnerable applications.

FIG. 2 illustrates an example method of controlling opening files by vulnerable software applications. In step 201, the monitoring module 103 detects the instance of creation of the file 102 by the source application 101. The monitoring module 103 may use various known methods for detecting creation of file 102, such as, for example, using a driver controlling the file opening (e.g., a file system filter driver); by intercepting system API function calls; using the API provided by the applications; or other methods. In step 202, the analysis module 104 determines the presence of vulnerabilities in the application 101. In one example aspect, the analysis module 104 may additionally determine the presence of vulnerabilities in the latest and in the previous versions of the source application 101, and presence of vulnerabilities in the consumer application 101a. If the source application 101 had never contained vulnerabilities, the analysis module 104 may determine whether the source application 101 is a source of untrusted files using for example, the application database 106.

In step 203, the analysis module 104 determines various parameters of the created file 102, which may include, but not limited to, file type, file size, file's ESD, the name of the certification authority of the EDS, the source of the file, presence of the file in a list of trusted files, file extension and other file parameters and metadata.

In one example aspect, depending on the information determined in step 202, the analysis module 104 may perform antivirus scan of the file 102. Antivirus scanning of the file 102 can be performed if, for example, unpatched vulnerabilities were found in the source application 101. Antivirus scan of the file may include one or more known methods of malware testing, such as signature-based and heuristic analysis, emulation, and others. In addition, the antivirus scan of the file 102 may include checking the file against a list of trusted files and using file reputation among the users of the antivirus software manufacturer. Moreover, if the source application 101 does not contain vulnerabilities, antivirus scan of the file 102 may be omitted. Results of antivirus scanning will be considered as file parameters (e.g., the file is not found in the database of malicious software, the file is an advertising program and so on).

In step 204, the policy determination module 105 determines a file access policy for the file 102 based on information determined in steps 202 and 203. In one example aspect, the file access policy specifies the access rights of the consumer application 101a to the computer resources, which were previously enumerated in the description of FIG. 1. In another example aspect, the file access policy specifies rules for the opening the file 102, such as, for example, allowing or prohibiting opening of the file 102 by the consumer application 101a.

In one example aspect, the consumer application 101a may be the source application 101 that created the file 102. At the same time, if the file 102 itself may be an executable file, a script file, or a link library, the consumer application 101a may be the file 102.

In another aspect, the consumer application 101a may perform the opening of the file 102 according to the file opening policy determined in step 204.

Table 1 shows examples of file access policies of a consumer application 101a.

.doc containing a macro, i.e., a script file. In this case, the file type may be allowed, but, due to the possible use of the macro by hackers, the access rights of the application Microsoft Word® may be limited when working with this file.

The table 1 also contains the file opening policies that depend on the presence of vulnerabilities in the source application 101 and the parameters of the file 102. In the example aspect, according to table 1, if the latest version of the application contains critical vulnerabilities, which have not been patched, while the file type is an allowed type of file, its opening may be denied regardless of whether the file 102 is executable or non-executable. In another example, if the application 101 contains noncritical vulnerabilities, the opening of executable files may be denied, while the opening of non-executable files may be allowed, however the consumer application 101a may have its access to the computer resources denied or limited. It is contemplated that limited access to computer resources according to the example aspect includes denial of access to some of the computer resources. For example, the consumer application 101a may be restricted from modifying the OS registry,

TABLE 1

| | | Vulnerabilities | | | |
| --- | --- | --- | --- | --- | --- |
| | | In latest application version | | In previous application versions | |
| File parameters | | Not critical/ none/all Critical corrected | If not corrected | All corrected | Application is a source of untrusted files |
| Allowed type | Executable | Deny opening | Deny opening | Limit access to resources | Deny access to resources | Deny access to resources |
| | Non-executable | Deny opening | Deny access to resources | Deny access to resources | Allow opening | Deny access to resources |
| Denied type | Executable | Deny opening | Deny opening | Deny opening | Deny opening | Deny opening |
| | Non-executable | Deny opening | Deny opening | Deny opening | Deny access to resources | Deny access to resources |

As shown, the first two rows of the table 1 contain information on the presence of vulnerabilities in the latest version of the source application 101, as well as in previous versions of the source application 101. The source application 101 may contain critical vulnerabilities, that constitute a substantial danger to the user's computer system (e.g., malware for theft of passwords or financial information might be installed on the computer), as well as noncritical vulnerabilities, which may include very limited privilege escalation vulnerabilities and locally exploitable Denial of Service vulnerabilities. This rating may be also used for non-sensitive system information disclosure vulnerabilities (e.g. remote disclosure of installation path of applications). Furthermore, corrected vulnerabilities are also considered in the table 1. In addition, a case of when the source application 101 is a source of untrusted application is also considered in the table 1.

Furthermore, the first two columns contain information on the file parameters. The example shown in table 1 considers the parameter "file type", which may be allowed or denied for opening by the consumer application 101a. For example, application Microsoft Word® is intended to work with text files, but not with multimedia or executable files. At the same time, Microsoft Word® can create a file of extension while the other actions mentioned in the description of FIG. 1 may be allowed. Furthermore, in both examples considered, the opening of files 102 of forbidden types will also be denied.

In yet another example, if no vulnerabilities were detected in the latest version of the application, but previous versions of the application had vulnerabilities for which correcting updates (e.g., patches) have been already released, then application may be allowed to open non-executable files of the allowed type without limitations. At the same time, an antivirus check may be performed for executable files of the allowed type.

In the last column of Table 1, according to the first rule, the executable file 102 of the allowed type will be denied access to computer resources if the source application 101 is a source of untrusted files.

In step 205, the control module 107 intercepts a request by the consuming application 101a to open the file 102. And, in step 206, the policy determination module 105 determines application launching policy for the consuming application 101a. The control module 107 may use any known method for intercepting request to open files 102 from the consuming application 101a, including, but not limited to: using a file system filter driver); by intercepting system API calls; or using the API provided by the applications.

In step 207, the policy determination module 105 determines the file opening policy of file 102 by the consuming application 101a depending on the file access policy and application launching policy of the consumer application 101a.

Table 2 shows an example of the file opening policy of the file 102 by the consumer application 101a.

TABLE 2

| No. | File access policy | Consumer application launching policy | File opening policy |
|---|---|---|---|
| 1 | Deny access to resources | Allow access to resources | Deny access to resources |
| 2 | Allow access to resources | Deny access to resources | Allow access to resources |
| 3 | Deny access to resources: 1) modification of the registry, priority 1; 2) low level access to the disk, priority 2; 3) direct access to the memory, priority 1; Allow access to resource: 1) creation and modification of autorun keys, priority 2; | Allow access to resources 1) modification of the registry, priority 2; 2) low level access to the disk, priority 1; Deny access to resources: 1) low level access to file system, priority 1; 2) creation and modification of autorun keys, priority 1; | Deny access to resources: 1) low level access to the disk, priority 2; 2) direct access to the memory, priority 1; Allow access to resources 1) modification of the registry, priority 2; 2) creation and modification of autorun keys, priority 2; 2) low level access to the disk, priority 1; |

In one example aspect, the file opening policy by the consumer application 101a can be selected as the most restrictive (prohibiting) of the application launching policies of the consumer application 101a and file opening policy for the file 102, as for example, provided in Rule 1 in Table 2. In another example aspect, the file opening policy can be selected as the least restrictive of the file access policies and application launching policies (i.e., allow access to resources), as for example provided in Rule 2 of Table 2.

In another example aspect, the restrictions contained in the policies of Table 2 may have different priorities. Rule 3 is an example of selection of the file opening policy depending on the priorities of the restrictions specified in the file access policy and application launching policy for the consumer application 101a. For example, a file access policy with priority 1 may impose a restriction on the modification of the OS registry, while an application launching policy for the consumer application 101a with higher priority 2 may allow modification of the register. As a result, the final file opening policy for the consumer application 101a will contain rule allowing the modification of the OS registry, because the policy with the higher priority 2 will prevail. Furthermore, the permissive rules in the file opening policy for consumer application 101a will also contain permissions to modify autorun keys and have priority 2, which is inherited from the file access policy, as well as permission for low-level access to the file resources, as this limitation is found only in the application launching policy of the consumer application 101a. The resulting file opening policy will also contain a prohibition on low-level disk access, inherited from the disk access policy with a higher priority than a similar permissive rule in the application launching policy for the consuming application 101a. Regardless of the low priority, the prohibition on the direct memory access is found only in the file access policy and, therefore, will be inherited by the file opening policy.

Figure 3:
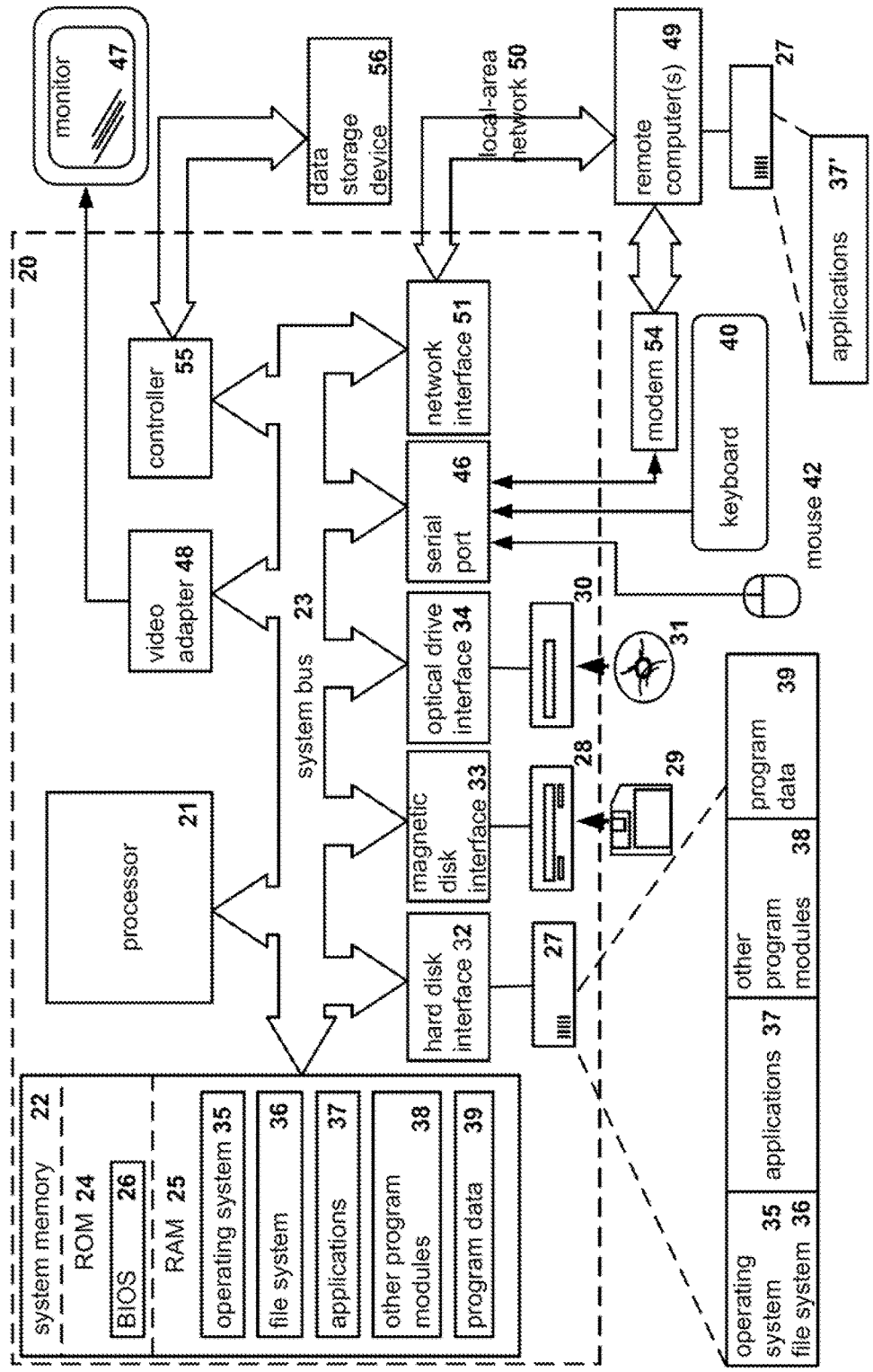
FIG. 3 illustrates an example of a general-purpose computer system on which the disclosed systems and method may be implemented.

FIG. 3 illustrates an example of a general-purpose computer system (which may be a personal computer or a server) on which the disclosed systems and method may be implemented. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the personal computer 20 by using input devices (keyboard 40, mouse 42). Other input devices (not shown) may be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer may be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 3. Other devices may also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium may comprise RAM, ROM, EEPROM, CD-ROM, Flash memory or other types of electric, magnetic, or optical storage medium, or any other medium that may be used to carry or store desired program code in the form of instructions or data structures and that may be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling opening of computer files by software applications on a user computer, the method comprising:
  detecting, by a hardware processor of the user computer, a request from a software application to open a computer file on the user computer;
  determining, by the hardware processor, one or more parameters of the computer file;
  determining, by the hardware processor, a file access policy associated with the requested computer file based on the parameters of the computer file, wherein the file access policy specifies at least access rights of the software application to computer resources of the user computer when working with the requested computer file;
  identifying, by the hardware processor, vulnerabilities of the software application;
  determining, by the hardware processor, an application launching policy for the software application based at least on the determined vulnerabilities, wherein the application launching policy specifies at least whether opening of the computer file is permitted or prohibited; and
  controlling, by the hardware processor, opening of the computer file on the user computer and accessing of the computer resources by the software application working with the opened computer file based at least on the file access policy and application launching policy.

2. The method of claim 1, wherein the software application includes one or more of a source application that created the computer file and a consumer application that requested opening of the computer file on the user computer.

3. The method of claim 2, wherein the computer file created by the source application includes one of a process, an executable file, a script file and a dynamic library.

4. The method of claim 2, further comprising:
  determining when the computer file is created by the source application using at least one of a file system filter driver, intercept of operating system (OS) Application Programming Interface (API) calls on the user computer, and API provided by the source application on the user computer.

5. The method of claim 1, wherein the parameters of the computer file determined by the hardware processor include at least one of a type of the computer file, a size of the computer file, a digital signature of the computer file, and an extension of the computer file.

6. The method of claim 1, wherein determining, by the hardware processor, one or more parameters of the computer file further includes:
   performing antivirus analysis of the computer file, wherein parameters of the computer file include results of the antivirus analysis.

7. The method of claim 1, wherein the identifying vulnerabilities of the software application further comprises:
   determining corrected vulnerabilities in the software application, determining vulnerabilities in previous versions of the software application, and determining corrected vulnerabilities in the previous versions of the software application.

8. The method of claim 1, further comprising:
   specifying priorities of the file access policies and application launching policies, whereby controlling opening of the computer file and accessing of the computer resources by the software application is based on the respective priorities of the file access policies and application launching policies.

9. The method of claim 1, wherein the access rights to the computer sources include prohibiting the software application from performing one or more of the following operations: low-level accessing to a file system of the computer; low-level accessing to a disk; executing a driver on the computer; modifying a registry of the computer; direct accessing of memory of the computer; obtaining a process descriptor; using a browser's API; modifying files with extensions .exe and .dll in directories "% System Root %" and "% ProgramFiles %", with all subdirectories, creating and modifying files in a Startup directory of the computer; creating and modifying auto run keys; accessing file resources with addresses including environment variables; and accessing user registry resources of the computer.

10. The method of claim 1, further comprising:
    determining, by the hardware processor, whether the software application is a source of untrusted files based on one or more of: searching in a database of known source applications of untrusted files, analysis of the behavior of the source application for loading of vulnerable modules or untrusted files; and analysis of metadata of the source application; and
    further controlling, by the hardware processor, opening of the computer file on the user computer and accessing of the computer resources by the software application based on the determination whether the software application is the source of untrusted files.

11. A system for controlling opening of computer files by software applications on a user computer, the system comprising:
    a hardware processor of the user computer configured to:
    detect a request from a software application to open a computer file on the user computer;
    determine one or more parameters of the computer file;
    determine a file access policy associated with the requested computer file based on the parameters of the computer file, wherein the file access policy specifies at least access rights of the software application to computer resources of the user computer when working with the requested computer file;
    identify vulnerabilities of the software application;
    determine an application launching policy for the software application based at least on the determined vulnerabilities, wherein the application launching policy specifies at least whether opening of the computer file is permitted or prohibited; and
    control opening of the computer file on the user computer and accessing of the computer resources by the software application working with the opened computer file based at least on the file access policy and application launching policy.

12. The system of claim 11, wherein the software application includes one or more of a source application that created the computer file and a consumer application that requested opening of the computer file on the user computer.

13. The system of claim 12, wherein the processor further configured to determine when the computer file is created by the source application using at least one of a file system filter driver, intercept of operating system (OS) Application Programming Interface (API) calls on the user computer, and API provided by the source application on the user computer.

14. The system of claim 11, wherein the parameters of the computer file determined by the hardware processor include at least one of a type of the computer file, a size of the computer file, a digital signature of the computer file, and an extension of the computer file.

15. The system of claim 11, wherein the identifying vulnerabilities of the software application further comprises:
    determining corrected vulnerabilities in the software application, determining vulnerabilities in previous versions of the software application, and determining corrected vulnerabilities in the previous versions of the software application.

16. The system of claim 11, wherein the processor is further configured to specify priorities of the file access policies and application launching policies, whereby controlling opening of the computer file and accessing of the computer resources by the software application is based on the respective priorities of the file access policies and application launching policies.

17. The system of claim 11, wherein the access rights to the computer sources include prohibiting the software application from performing one or more of the following operations: low-level accessing to a file system of the computer; low-level accessing to a disk; executing a driver on the computer; modifying a registry of the computer; direct accessing of memory of the computer; obtaining a process descriptor; using a browser's API; modifying files with extensions .exe and .dll in directories "% System Root %" and "% ProgramFiles %", with all subdirectories, creating and modifying files in a Startup directory of the computer; creating and modifying auto run keys; accessing file resources with addresses including environment variables; and accessing user registry resources of the computer.

18. The system of claim 11, wherein the processor is further configured to:
    determine whether the software application is a source of untrusted files based on one or more of: searching in a database of known source applications of untrusted files, analysis of the behavior of the source application for loading of vulnerable modules or untrusted files; and analysis of metadata of the source application; and
    further control opening of the computer file on the user computer and accessing of the computer resources by the software application based on the determination if the software application is the source of untrusted files.

19. A non-transitory computer readable medium comprising computer executable instructions for controlling opening of computer files by software applications on a user computer, including instructions for:
- detecting a request from a software application to open a computer file on the user computer;
- determining one or more parameters of the computer file;
- determining a file access policy associated with the requested computer file based on the parameters of the computer file, wherein the file access policy specifies at least access rights of the software application to computer resources of the user computer when working with the requested computer file;
- identifying vulnerabilities of the software application;
- determining an application launching policy for the software application based at least on the determined vulnerabilities, wherein the application launching policy specifies at least whether opening of the computer file is permitted or prohibited; and
- controlling opening of the computer file on the user computer and accessing of the computer resources by the software application working with the opened computer file based at least on the file access policy and application launching policy.

20. The non-transitory computer readable medium of claim 19, wherein the software application includes one or more of a source application that created the computer file and a consumer application that requested opening of the computer file on the user computer.

21. The non-transitory computer readable medium of claim 19, wherein the identifying vulnerabilities of the software application further comprises:
- determining corrected vulnerabilities in the software application, determining vulnerabilities in previous versions of the software application, and determining corrected vulnerabilities in the previous versions of the software application.

22. The non-transitory computer readable medium of claim 19, further comprising instructions for:
- determining whether the software application is a source of untrusted files based on one or more of: searching in a database of known source applications of untrusted files, analysis of the behavior of the source application for loading of vulnerable modules or untrusted files; and analysis of metadata of the source application; and
- further controlling opening of the computer file on the user computer and accessing of the computer resources by the software application based on the determination if the software application is the source of untrusted files.

* * * * *